Oct. 27, 1931.   E. E. HEWITT   1,828,967

CHECK VALVE

Filed Dec. 6, 1928

INVENTOR
ELLIS E. HEWITT
BY Wm. M. Cady
ATTORNEY

Patented Oct. 27, 1931

1,828,967

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

CHECK VALVE

Application filed December 6, 1928. Serial No. 324,146.

This invention relates to check valves of the type usually employed in fluid pressure brake apparatus and the like.

An object of the invention is to provide a check valve which is simple in construction, and reliable and exact in function under all conditions of service.

Another object of the invention is to provide a check valve in which the valve body is composed of a plurality of disks which are clamped together by a bolt in such a manner that relative movement of the disks is prevented.

Another object of the invention is to provide a check valve which is composed of a plurality of disk-like members formed from sheet material.

Another object of the invention is to provide a check valve which is composed of a plurality of superposed disks formed from different materials and having different diameters.

The invention also comprises certain new and useful improvements in the construction, arrangement and combination of the several parts of which it is composed, as will be hereinafter more fully described and claimed.

Figure 1:
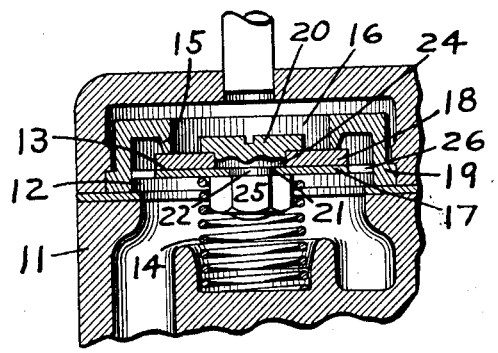
Figure 2:
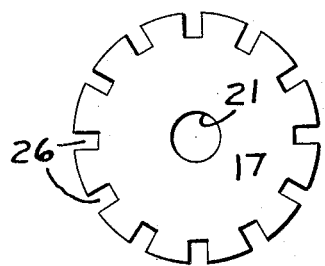
Figure 3:
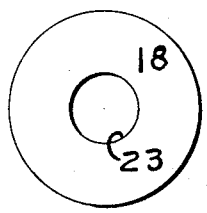
Figure 4:
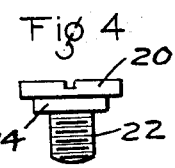

In the accompanying drawings; Figure 1 is a section through a portion of a fluid pressure apparatus equipped with a check valve constructed according to the present invention; Fig. 2 is a plan of one of the valve disks; Fig. 3 is a plan of another of the valve disks; and Fig. 4 is a detail view of the bolt.

Referring to the drawings, the fluid pressure apparatus 11, is formed with a chamber 12 in which is mounted a check valve 13. On one side the check valve is subject to the pressure of an expansible coil spring 14, which is adapted to force the valve against a seat rib 15 so as to cut off communication from the chamber 12 to a chamber 16.

In the present instance the check valve 13 is shown as comprising a pair of superposed disks 17, 18, the former having a greater diameter than the latter so as to engage the side wall 19 of the chamber 12 and be guided thereby.

Both of the disks 17, 18, are preferably constructed from suitable sheet material. For instance, the disk 17 may be made from iron, steel, brass or any other suitable metal, while the disk 18 may be made from a rubber composition, fibre, or any other suitable material which will provide a resilient seat when the check valve 13 is forced against the seat rib 15 by the action of the spring 14.

For the purpose of permitting the fluid to flow past the disk 17, a plurality of openings or notches 26 are formed in the periphery of said disk.

When the disks 17, 18, are assembled in the manner shown in Fig. 1, a bolt 20 is passed through alined openings 21 and 23 formed respectively in said disks. As shown, the opening 21 in the disk 17 is of a size to snugly receive the threaded shank 22 of the bolt, while the opening 23 has a greater diameter than the opening 21 so as to receive an enlarged portion 24 on the lower side of the head of the bolt. A nut 25 is screwed on to the shank of the bolt so as to force the disks towards the head thereof, thereby firmly clamping them together, as will be readily understood.

The construction provided greatly reduces the cost of manufacturing the check valves in quantity production, inasmuch as careful machine work of the major valve parts has been eliminated. Furthermore, a greater variety of check valves composed of superposed disks of varying diameters can be produced by the present invention than has heretofore been practical by employing any of the known methods. The disks can best be formed by stamping the same from suitable sheet material, which it will be observed requires but a single operation in forming each disk, because the opening 23 can be punched in the disk 18 simultaneously with the cutting of the disk from the sheet material, and the opening 21 and the notches 26 can likewise be produced when the press punches the disk 17 from the sheet metal. Also, the bolt 20 can be cheaply formed from stock material, the enlarged portion 24 being produced by cutting away the stock usually used in the head.

While one illustrative embodiment of the invention has been described in detail, it is not my intention to limit its scope to that embodiment or otherwise than by the terms of the appended claim.

Having now described my invention, what I claim as new and desire to secure by Letters Patent, is:—

In a fluid pressure apparatus, the combination with a chamber provided with a seat rib, of a valve device mounted in the chamber and adapted to engage the seat rib, said valve device comprising a plurality of superposed disks, one of which has a diameter corresponding approximately to the diameter of the chamber, the other disk constituting a seat for engaging the seat rib, the larger disk being provided with peripheral notches, a perforation formed centrally in each disk, the perforation in the smaller disk being greater in area than the perforation in the larger disk, a bolt having a head engaging the smaller disk, said bolt having a shank of two diameters, the largest portion of the shank being disposed in the perforation in the smaller disk, the remaining portion of the shank being threaded and passing through the larger disk, a nut mounted on the threaded shank of said bolt and bearing against the larger disk for clamping the two disks together, and an expansible coil spring bearing at one end against the face of the larger disk for forcing the smaller disk against the seat rib, said spring encircling said nut whereby said valve is maintained correctly positioned in said chamber.

In testimony whereof I have hereunto set my hand, this 3rd day of December, 1928.

ELLIS E. HEWITT.